United States Patent
Kim et al.

(10) Patent No.: US 9,497,634 B2
(45) Date of Patent: Nov. 15, 2016

(54) MOBILE DEVICE, AND METHOD FOR RELEASING LOCK OF THE MOBILE DEVICE

(71) Applicant: Samsung Electronics Co., Ltd., Gyeonggi-do (KR)

(72) Inventors: Sangho Kim, Gyeonggi-do (KR); Musik Kwon, Seoul (KR); Moorim Kim, Gyeonggi-do (KR); Seongtaek Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/787,142

(22) Filed: Mar. 6, 2013

(65) Prior Publication Data
US 2014/0038558 A1      Feb. 6, 2014

(30) Foreign Application Priority Data

Aug. 1, 2012   (KR) ........................ 10-2012-0084328

(51) Int. Cl.
*H04W 12/08*     (2009.01)
*H04W 52/02*     (2009.01)
*G06F 3/0481*    (2013.01)

(52) U.S. Cl.
CPC ......... *H04W 12/08* (2013.01); *H04W 52/0254* (2013.01); *G06F 3/0481* (2013.01)

(58) Field of Classification Search
CPC ... H04W 12/06; H04W 12/08; H04W 88/02; H04W 52/0254; G06F 3/0481; G06F 3/048; G06F 3/04883; G06F 3/0488; G06F 3/0416; G06F 21/31; G06F 3/017; G06F 3/03545; H04M 2250/22
USPC ....................................................... 455/411
See application file for complete search history.

(56) References Cited

U.S. PATENT DOCUMENTS

| | | | | |
|---|---|---|---|---|
| 5,802,361 A | * | 9/1998 | Wang ................ | G06F 17/30256 379/202.01 |
| 7,912,842 B1 | * | 3/2011 | Bayliss ............ | G06F 17/30303 707/749 |
| 2004/0203594 A1 | * | 10/2004 | Kotzin et al. ................. | 455/411 |
| 2005/0212911 A1 | * | 9/2005 | Marvit .................... | G06F 3/017 348/154 |
| 2010/0162182 A1 | * | 6/2010 | Oh et al. ........................ | 715/863 |
| 2012/0007713 A1 | * | 1/2012 | Nasiri ................... | G06F 1/1694 340/5.81 |
| 2012/0271632 A1 | * | 10/2012 | Do et al. ....................... | 704/246 |
| 2012/0306927 A1 | * | 12/2012 | Lee ......................... | G06F 3/041 345/660 |
| 2013/0346913 A1 | * | 12/2013 | Smith ................. | G06F 3/04883 715/784 |

* cited by examiner

*Primary Examiner* — Daniel Lai
(74) *Attorney, Agent, or Firm* — The Farrell Law Firm, P.C.

(57) ABSTRACT

A lock state releasing method and a mobile device that releases the lock state by identifying input features of a signature, are provided. The method includes detecting an input signature for releasing the lock state, identifying an input means corresponding to the input, extracting an input feature of the input, calculating similarities and setting weights according to input features, calculating a total similarity, based on the similarities, determining whether the verification is successful, based on the total similarity, and releasing the lock state if the verification has succeeded.

15 Claims, 15 Drawing Sheets

| Input means | shape | Average speed | Speed deviation | ... |
|---|---|---|---|---|
| pen | *Brown* | 40 pixel/ms | 11 pixel/ms | ... |
| finger | *Brown* | 42 pixel/ms | 5 pixel/ms | ... |

FIG. 7

| input means | shape | Average speed | Speed deviation |
|---|---|---|---|
| pen | *brown* | 40 pixel/ms | 11 pixel/ms |
| finger | *Brown* | 42 pixel/ms | 5 pixel/ms |
| ... | ... | ... | ... |

FIG. 12

| input means | Verification input means | f | EER [%] | threshold value |
|---|---|---|---|---|
| Pen | Pen | 0.3 | 5.54 | 610 |
| | | 0.45 | 6.04 | 631 |
| | | 0.7 | 8.47 | 670 |

FIG. 13

| input means | Verification input means | f | EER [%] | threshold value |
|---|---|---|---|---|
| Pen | Pen | 0.45 | 5.63 | 613 |
| Pen | Finger | 0.45 | 14.95 | 416 |
| Finger | Finger | 0.45 | 6.33 | 610 |
| Finger | Pen | 0.45 | 17.12 | 492 |

FIG. 14

| input means | f | threshold value |
|---|---|---|
| Pen | fp1 | Tp1 |
| | fp1 | Tp2 |
| | ... | ... |
| | fpn | Tpn |
| Finger | ff1 | Tf1 |
| | ff2 | Tf2 |
| | ... | ... |
| | ffn | Tfn |

MOBILE DEVICE, AND METHOD FOR RELEASING LOCK OF THE MOBILE DEVICE

PRIORITY

This application claims priority under 35 U.S.C. §119(a) to a Korean patent application filed on Aug. 1, 2012 in the Korean Intellectual Property Office and assigned Serial No. 10-2012-0084328, the contents of which are incorporated herein by reference.

BACKGROUND OF THE INVENTION

1. Field of the Invention

The present invention relates generally to a method for releasing a mobile device lock, and more particularly, to a method for releasing a lock state of a mobile device by identifying features of a signature input by a user's hand and a stylus pen, and threshold values and weights to identify the similarities of the input features.

2. Description of the Related Art

As the number of touch screen-based mobile device users has increased, so too has the importance of protecting personal information in the mobile devices. A variety of methods for protecting such information have been developed.

FIG. 1 illustrates a conventional method for releasing a lock in a mobile device. Referring to FIG. 1, the conventional mobile device receives and stores a specific pattern for releasing the lock state, input via a user's finger touch. The mobile device releases the lock state when the user's subsequent input pattern matches the stored pattern.

Since the conventional pattern for releasing a lock state of a mobile device is set by using nine points arranged in matrix form on the screen, it may be configured with a relatively simple combination. Therefore, the pattern cannot lock the mobile device with a high level of security. Accordingly, mobile devices require a lock-releasing system to input more sophisticated patterns, which is achieved by using pens that allow users to perform more sophisticated input operations.

However, since a stylus pen input differs from a user's hand input, the pattern matching results between the inputs by the user's hand and the stylus pen cause a deviation of the lock-releasing patterns. Accordingly, there is a need in the art for a system which considers the features of input means when they are applied to the mobile device to release the lock state.

SUMMARY OF THE INVENTION

The invention has been made in view of the above problems, and provides a mobile device and method that identifies a feature of a signature input by a user's hand or a stylus pen, and release a lock state of a mobile device.

The invention further provides a mobile device and method that identifies a threshold value and a weight to set similarities for features of a signature input by a user's hand and a stylus pen, and determines whether to release the lock state of a mobile device according to the inputs of the user's hand and the stylus pen.

In accordance with an embodiment of the invention, a method for releasing a lock state of a mobile device includes detecting an input of a signature for releasing the lock state, identifying an input means corresponding to the input, extracting at least one of input feature of the input, calculating similarities of each of the at least one of the input feature by comparing the extracted input feature with that of previously stored signature information, setting weights each of the at least one of the input feature, based on the input means, calculating a total similarity, based on the similarities of each of the at least one of the input feature and the weights, determining whether the verification is successful, based on the total similarity, and releasing the lock state when the verification has succeeded.

In accordance with another embodiment of the invention, a mobile device includes an input unit which detects an input of a signature for releasing the lock state, and a controller which identifies an input means corresponding to the input, extracts at least one of input feature of the input, calculates similarities of each of the at least one of input feature by comparing the extracted input feature with that of previously stored signature information, sets weights each of the at least one of the input feature, based on the input means, calculates a total similarity, based on the similarities of each of the at least one of the input feature and the weights, determines whether the verification is successful, based on the total similarity, and releases the lock state when the verification has succeeded.

BRIEF DESCRIPTION OF THE DRAWINGS

The features and advantages of the invention will become more apparent from the following detailed description viewed in conjunction with the accompanying drawings, in which:

FIG. 7 a table in which input features and information regarding input means are stored, according to an embodiment of the invention;

FIG. 12 illustrates a table of the EER performance and the threshold values, according to the change in weight;

FIG. 13 illustrates a table of the EER performance and the threshold values, according to the change of input means;

FIG. 14 illustrates a table of the optimal weight and the threshold values, according to the input means.

DETAILED DESCRIPTION OF EMBODIMENTS OF THE INVENTION

Figure 1:
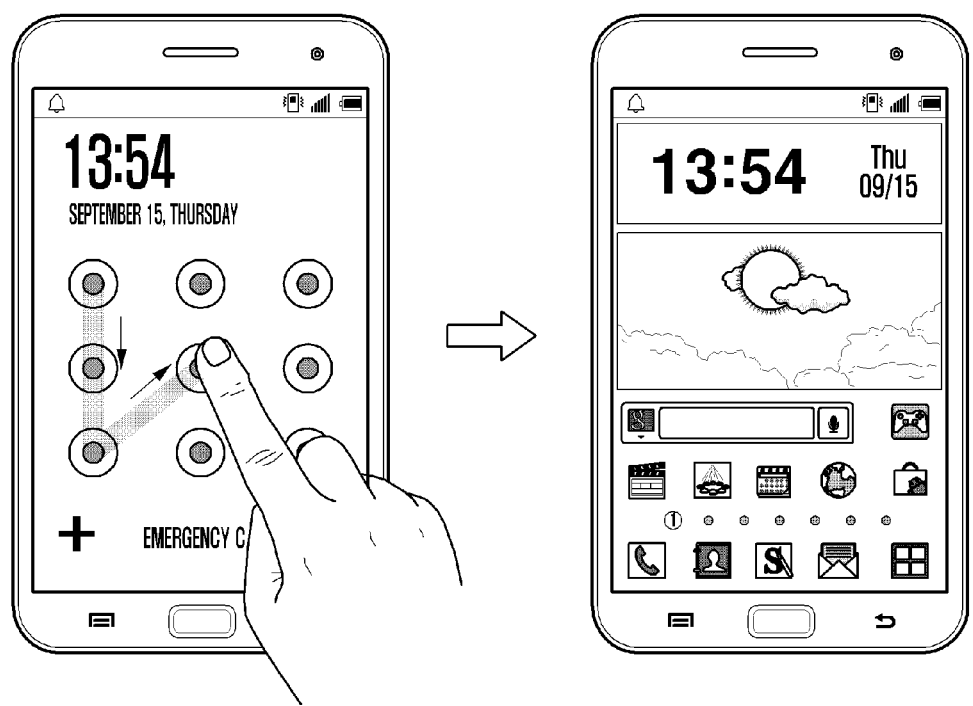
FIG. 1 illustrates a conventional method for releasing a lock in a mobile device.

Embodiments of the present invention are described with reference to the accompanying drawings in detail. The same reference numbers are used throughout the drawings to refer to the same or like parts. Detailed descriptions of well-known functions and structures incorporated herein may be omitted for the sake of clarity and conciseness.

The invention is applied to a mobile device with a lock function and control of the mobile device.

A mobile device with a lock function according to the present invention can be applied to all information communication devices, electronic devices, and their applications, when they are equipped with a lock function, for example, smart phones, portable terminals, mobile communication terminals, Personal Digital Assistants (PDAs), Portable Multimedia Players (PMPs), computers, laptop computers, note pad devices, Wibro terminals, tablet PCs, smart TVs, smart refrigerators, etc.

In the following description, the term 'signature' refers to text, an image/images, that a user inputs to a mobile device in order to release the lock state. Examples of the signature are a user name, a user's set letter, a number, a word, a sentence, or an image, in addition to other examples.

The terms or words described in the present description and the claims should not be limited by a general or dictionary meaning, instead should be analyzed as a meaning and a concept through which the inventor defines and describes the invention at his most effort, to comply with the idea of the invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

As used herein, the singular forms "a," "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 2:
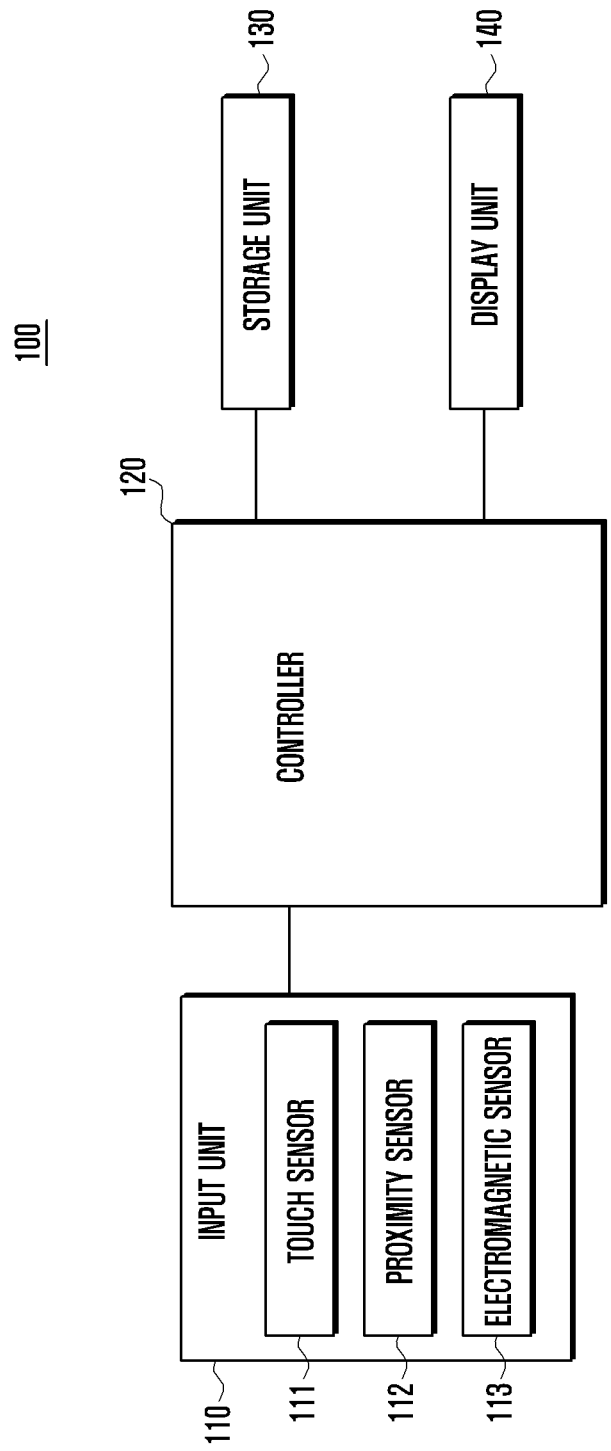
FIG. 2 illustrates a schematic block diagram of a mobile device according to an embodiment of the invention.

FIG. 2 illustrates a schematic block diagram of a mobile device according to an embodiment of the invention.

Referring to FIG. 2, the mobile device 100 includes an input unit 110, a controller 120, a storage unit 130 and a display unit 140.

The input unit 110 creates the operation signals according to the user's inputs. The input unit 110 includes a touch sensor 111, a proximity sensor 112 and an electromagnetic sensor 113.

The touch sensor 111 detects the user's touch inputs and may include a touch film, a touch sheet, or a touch pad, for example. The touch sensor 111 detects a touch input and transfers the detected touch signal to the controller 120. The controller 120 analyzes the touch signal and executes the corresponding function. The information corresponding to the detected touch signal may be displayed on the display unit 140. The touch sensor 111 may receive operation signals created when the user inputs touches via a variety of touch means, and an operation signal by a user's body (such as hand). According to the types of implementations, the touch sensor 111 may detect a direct touch or a proximity input within a certain range of distance.

The proximity sensor 112 detects, for example, a presence, an approach, a motion, a direction, a speed, or a shape of a nearby object in the detection surface of the input unit 110, via the intensity of electromagnetic field, without any mechanical contact. The proximity sensor 112 may be implemented with various types of sensors, such as a transmission photoelectric type, a direct reflective photoelectric type, a mirror photoelectric type, a high frequency oscillation type, a capacitance sensor, a magnetic type, or an infrared type.

The electromagnetic sensor 113 detects a touch or proximity input according to the change in intensity of electromagnetic field. The electromagnetic sensor 113 may be an Electro Magnetic Resonance (EMR) type of input pad. The electromagnetic sensor 113 includes coils inducing magnetic fields and detects the approach of an object including a resonant circuit that creates the change in magnetic field energy. The electromagnetic sensor 113 also detects an input via an object including a resonant circuit, such as a stylus pen. The electromagnetic sensor 113 further detects a proximity input or hovering input to the mobile device 100 as well as an input to the mobile device 100 via a direct touch.

Figure 3:
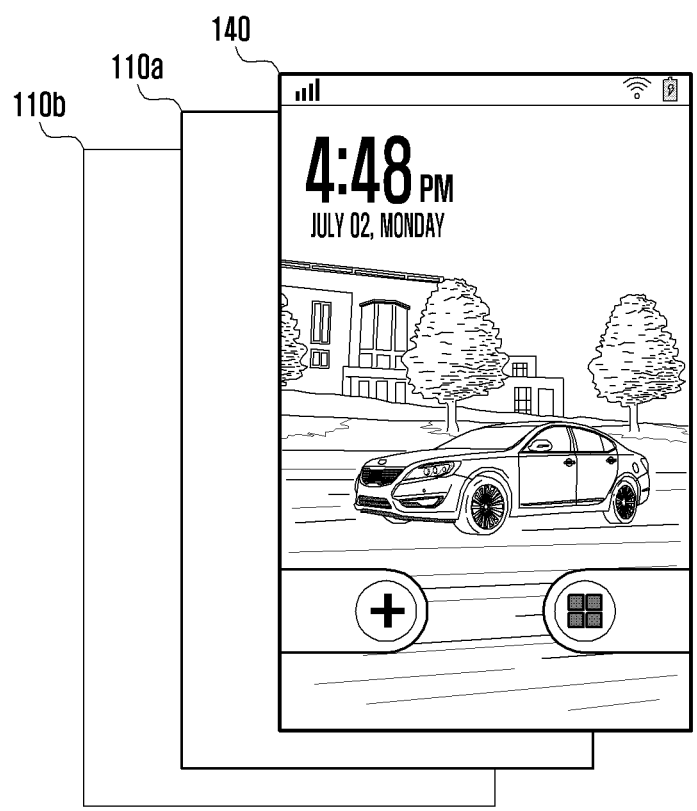
FIG. 3 illustrates a configuration of the input unit according to an embodiment of the invention.

Referring to FIG. 3, the input unit 110 includes first 110a and second 110b input pads forming layers. The first 110a and second 110b input pads may be implemented with a pressure pad, a touch pad, including a proximity sensor 112 and a touch sensor 111, or an EMR pad, an electromagnetic pad with an electromagnetic sensor 113. The first 110a and second 110b input pads may be implemented with different types of input means, and detect the inputs via the respective input means. If the first input pad 110a is implemented with a touch pad, it detects a touch input by a user's body.

If the second input pad 110b is implemented with an EMR pad, it detects an input by a stylus pen. The input unit 110 may be configured to form a layer with the display unit 140. The first 110a and second 110b input pads are placed under the display unit 140, and detects inputs created via icons, menus, and buttons displayed on the display unit 140. The display unit 140 may be a display panel or a Touch Screen Panel (TSP) combined with an input pad. The controller 120 identifies the type of input means according to whether the input signal is detected via the first 110a or second 110b input pad.

The configuration combined the input unit 110 with the display unit 140, as shown in FIG. 3, is an example. Therefore, it should be understood that there are many possible modifications according to the number and type of input pads of the input unit 110 and the arrangement of the display unit 140 and the input pad forming upper and lower layers, according to the manufacture technology of the mobile device 100.

The input unit 110 detects an input of a signature for releasing a lock state of the mobile device or detects an input for registering a signature.

The controller 120 controls respective components in the mobile device 100, thereby controlling the entire operation of the mobile device 100. For example, the controller 120 manages a signature for releasing a lock state of the mobile device 100, and releases the lock state via the signature.

The controller 120 identifies an input means corresponding to an input detected via the input unit 110, and extracts the input feature. The controller 120 performs a verification procedure, by comparing the input feature with that of previously stored signature information, and releases a lock state of the mobile device 100 based on the verification procedure result.

The controller 120 sets a threshold value and a weight based on the input means, and determines whether the verification is successful based on the threshold value and the weight.

The storage unit 130 stores programs or instructions related to the operations of the mobile device 100. The controller 120 executes the programs or processes the instructions.

The storage unit 130 may be implemented with various types of storage media, such as flash memory, hard disk, multimedia card micro memory, a memory card, Random Access Memory (RAM), Static Random Access Memory (SRAM), Read-Only Memory (ROM), Electrically Erase Programmable Read-Only Memory (EEPROM), Programmable Read-Only Memory (PROM), magnetic memory, magnetic disk, or optical disk.

The storage unit 130 stores the user's signature information that includes an input feature, or a type of input means that the user uses when registering a signature. The storage unit 130 also stores threshold values and weights corresponding to input features.

The display unit 140 displays information processed in the mobile device 100, such as a User Interface (UI) or Graphic User Interface (GUI) related to the control of functions of the mobile device 100.

The display unit 140 may be implemented with a flat display panel, such as a Liquid Crystal Display (LCD), a Thin Film Transistor-Liquid Crystal Display (TFT LCD), Organic Light Emitting Diodes (OLEDs), a flexible display, or a three-dimensional (3D) display.

The display unit 140 may be configured with a touch screen and touch sensors serving as the input unit 110, where the touch screen and touch sensors form layers. The display unit 140 may be implemented with a display panel combined with touch sensors such as a TSP. That is, the display unit 140 serving as a touch screen may also serve to perform functions of an input device.

The display unit 140 can also display a signature corresponding to a user's input.

It should be understood that the mobile device 100 may be modified in such a manner that it may remove part of the components shown in FIG. 2 or may further include other components (not shown), showing the features of the invention.

Figure 4:
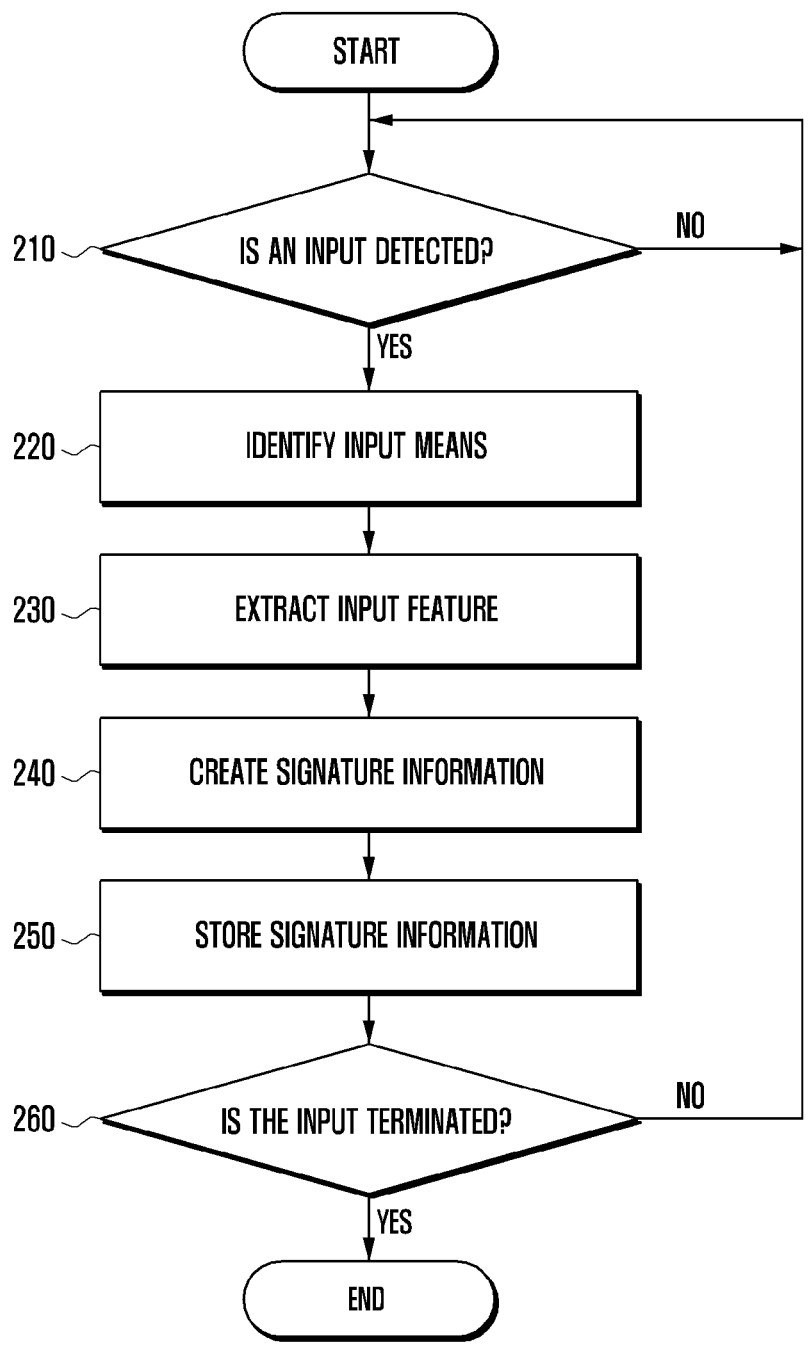
FIG. 4 illustrates a flow chart that describes a method for registering a user's signature in a mobile device according to an embodiment of the invention.

FIG. 4 illustrates a flow chart that describes a method for registering a user's signature in a mobile device according to an embodiment of the invention. Referring to FIG. 4, the mobile device 100 detects an input (210).

The mobile device 100 detects an input for registering a user's signature while an application, such as for registering signature, a setting program, or a service program, are executed.

The mobile device 100 enters a lock state that relates to a variety of lock functions, such as a lock mode, a memo set with a lock, a function for opening image files, video files, contact lists, schedules, and a function for purchasing paid information, applications, and contents. A signature serves to release a lock state of the mobile device 100. The signature may be implemented with a shape such as of a motion/operation when drawing a letter, a number, or a special symbol.

The input for registering a signature may be input to the mobile device 100 via a specific input means, such as a user's finger, or a stylus pen. The types of inputs may be a touch input and a proximity input.

Figure 5:
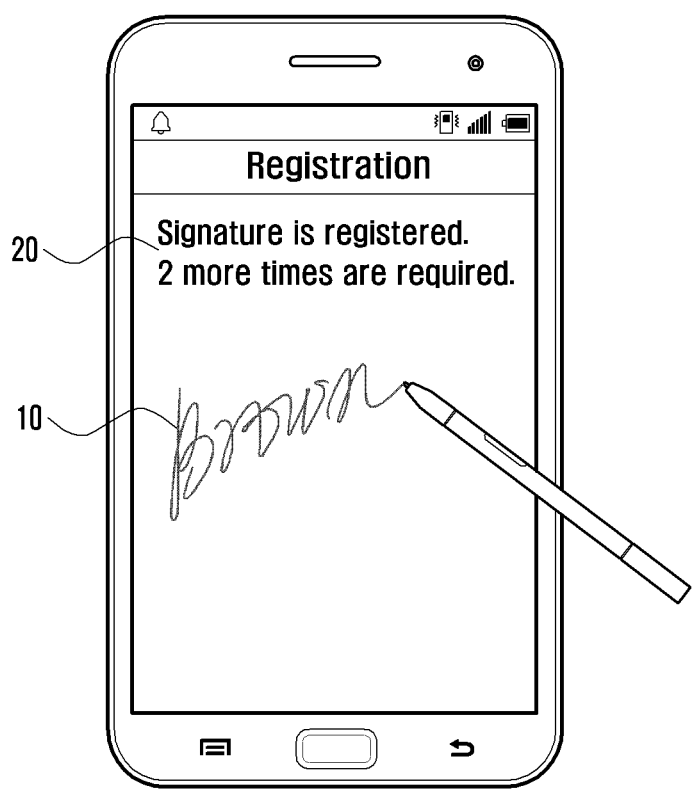
FIG. 5 illustrates a signature input to register a signature according to an embodiment of the invention.

As shown in FIG. 5, the mobile device 100 detects an input 10 for registering a user's signature. The input 10 may be a touch input by a stylus pen or a shape forming a word 'Brown.'

When detecting an input at step 210, the mobile device 100 identifies the input means at step 220.

The mobile device 100 identifies an input means, such as a user's finger or a stylus pen, according to a detected input. Alternatively, the mobile device 100 may include a number of sensors to detect various types of input means. In that case, the mobile device 100 identifies an input means via the corresponding sensor that detects the input. The mobile device 100 may include a number of sensors configured in a pad, such as a touch pad or an EMR pad. The mobile device 100 detects types of input means based on areas to which the input means is applied. For example, if the mobile device 100 ascertains that a detected area to which an input means is applied is greater than a threshold value, the mobile device 100 identifies the input means as a user's finger. If a detected area to which an input means is applied is less than or equal to the threshold value, the mobile device 100 identifies the input means as a stylus pen.

The mobile device 100 then extracts a feature of the detected input at step 230.

The mobile device 100 could alternatively identify the input means and simultaneously extract the input feature.

The input feature includes at least one of a type of input means, a shape of an inputting gesture, and a speed of an inputting gesture, for example.

Figure 6:
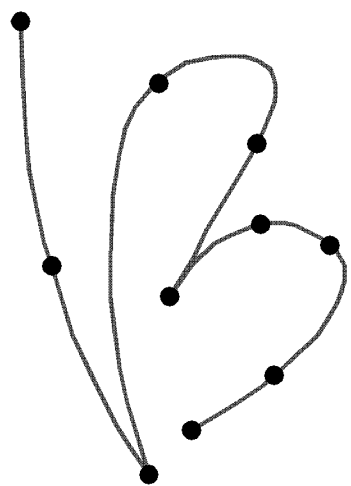
FIG. 6 illustrates a process for extracting an input feature according to an embodiment of the invention.

As shown in FIG. 6, the mobile device 100 may extract two- or three-dimensional coordinates of a detected input at a preset period. The mobile device 100 can extract the coordinates, on a basis of a point where an input started, as the original point. Since the mobile device 100 extracts coordinates of inputs, based on a relative point where an input started and not an absolute point, the mobile device 100 can extract a shape of an input operation, irrespective of the location/point where the input is detected. The mobile device 100 can calculate a movement distance (based on a measurement of pixels, mm, or cm) of an input operation input during a preset period, based on the extracted coordinates, and then compute the speed of the input operation according to the period. The mobile device 100 can compute the average speed or the speed deviation for the entire input operation.

For example, the mobile device 100 can extract coordinates from the input 10, 'Brown,' as shown in FIG. 5, during a preset period, and create an input feature including the shape and/or the speed, based on the extracted coordinates as shown in FIG. 6.

The mobile device 100 then creates the signature information at step 240.

The mobile device 100 can create a user's signature information based on the input means and the extracted input feature. As shown in FIG. 7, signature information may be created by associating input means with input features. That is, signature information includes information regarding input means and the input features according to the input means.

Referring to FIG. 7, signature information includes an input feature that includes an input means, an input shape, an average speed, and a speed deviation, for example.

The input shape corresponds to data representing an image created when an input operation forms a track or data to be shown as coordinates extracted according to a preset period from an input. The extracted coordinates may refer to a location relative to a point where the input started, not an absolute point where the input is made. Therefore, the coordinates of an input may represent a shape formed by an input, on the basis of a point where the input starts, irrespective of an absolute point where the input is made.

The average speed refers to a value that is calculated via the coordinates extracted from the inputs. A speed according to periods can be calculated via a distance between coordinates extracted at a certain period. An average speed can be calculated by averaging speeds according to periods. The speed deviation refers to a deviation of speeds for respective periods, based on the average speed.

The mobile device 100 can extract an input feature, on the basis of the coordinates, as shown in FIG. 6, extracted from an input 10, 'Brown,' as shown in FIG. 5. The mobile device 100 can calculate speeds according to periods, by detecting the number of pixels between coordinates extracted every a preset period, 1 ms. The mobile device 100 averages speeds according to periods, and calculates the average speed for inputs by a stylus pen as shown in FIG. 7, thereby creating a user's signature information including the calculation result of 40 pixels/ms. Alternatively, as shown in FIG. 5, the mobile device 100 can extract the input 10, 'Brown,' as image data, thereby creating a user's signature information including the extracted image data. In that case, the mobile device 100 may create a user's signature information by extracting coordinates from the input 10, 'Brown,' every 1 ms.

After creating a user's signature information at step 240 of FIG. 4, the mobile device 100 stores the signature information in the storage unit 130 at step 250.

The mobile device 100 may store the signature information created by associating an input means with the input feature. The mobile device 100 may also store a threshold value and a weight for the input feature, together with the signature information. The mobile device 100 determines a threshold value and a weight corresponding to the input means, and stores the information associated with the input means. A detailed description regarding weights and threshold values will be described later herein.

After storing the user's signature information at step 250, the mobile device 100 determines whether the input termination is made at step 260, based on a user's request or by detecting whether the number of times of detecting input matches a preset number. For example, if the mobile device 100 ascertains that the user stops inputting and a request is created to confirm the user's signature information, the mobile device 100 concludes that the input is terminated. Alternatively, if the mobile device 100 ascertains that the number of times of detecting input matches a preset number, the mobile device 100 concludes that the input is terminated.

Although the user may make inputs for a signature corresponding to the stored signature information, features of user's inputs may differ from each other each time that they are input. Therefore, the mobile device 100 detects inputs to register the user's signature by a preset number of times. In addition, the mobile device 100 extracts input features for a preset number of inputs respectively, and then calculates the deviation for the respective input features, based on the extracted input features. For example, the mobile device 100 can extract the deviation of a number of speeds extracted from the corresponding input numbers respectively. The mobile device 100 creates the signature information based on the extracted input features and stores the signature information.

While the mobile device 100 detects inputs for a signature, the mobile device 100 displays the remaining number to reach a preset number of input times, such as '2 more times are required,' labeled by reference number 20 as shown in FIG. 5.

While the mobile device 100 detects inputs for a signature by a preset number of input operations, the mobile device 100 can compare the input features of the inputs with each other. If the mobile device 100 ascertains that there is a relatively large difference between the input features of the inputs to register a signature, the mobile device 100 can display a message showing that the input for a signature fails. For example, if the user inputs 'Brown,' at the first input operation and then 'John,' at the second, the mobile device 100 ascertains that 'Brown' and 'John' differ from each other in terms of input shape and input speed and thus cannot create the user's signature information to be registered. In that case, the mobile device 100 informs the user that the input fails and waits for a user's input for a signature.

If the mobile device 100 ascertains that the input termination is not made at step 260, the mobile device 100 returns to and detects a user's input for registering a signature at step 210.

If the mobile device 100 ascertains that the input termination is made at step 260, the mobile device 100 sets the stored signature information in the mobile device 100 and terminates the signature registering procedure.

As such, the mobile device 100 identifies the input features of types of input means, such as user's finger or stylus pen, which may create a deviation of inputs for a signature to be registered, and stores the input features. This minimizes the deviation with respect to the input detection performance between input means and enables correct verification of the registered signature.

Figure 8:
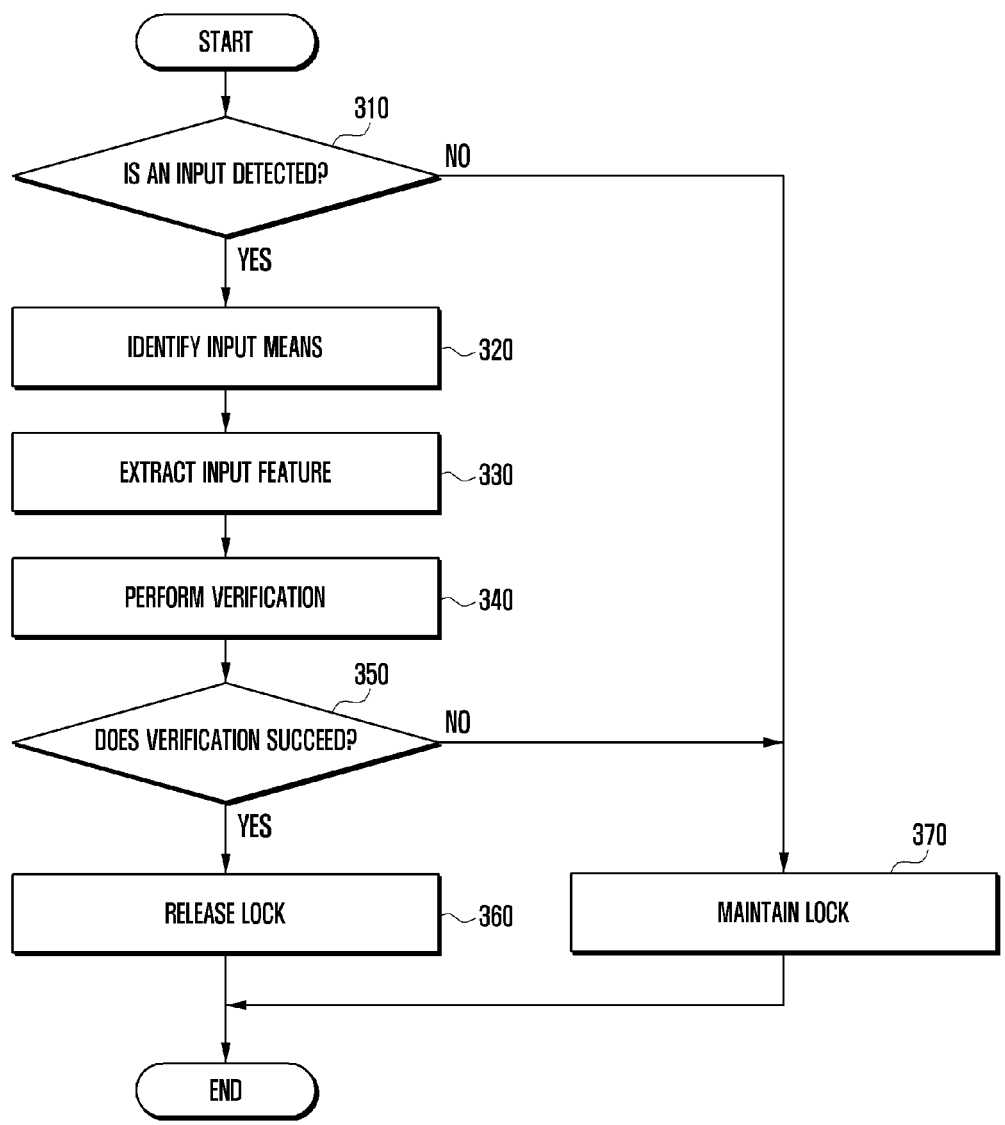
FIG. 8 illustrates a method for releasing a lock of a mobile device according to an embodiment of the invention.

FIG. 8 illustrates a method for releasing a lock of a mobile device according to an embodiment of the invention. Referring to FIG. 8, the mobile device 100 detects an input at step 310.

The mobile device 100 detects an input of a signature to release the lock state while an application, a setting program, or a service program are executed.

The mobile device 100 enters a lock state that relates to a variety of lock functions, such as a lock mode, a memo set with a lock, a function for opening image files, video files, contact lists, or schedules, and a function for purchasing paid information, applications, and contents. A signature serves to release a lock state of the mobile device 100. The signature may be implemented with a shape, such as a motion/operation when drawing a letter, a number, or a special symbol.

The signature for releasing the lock state may be input to the mobile device 100 via a specific input means, such as a user's finger or a stylus pen. The types of inputs may be a touch input or a proximity input, for example.

Figure 9:
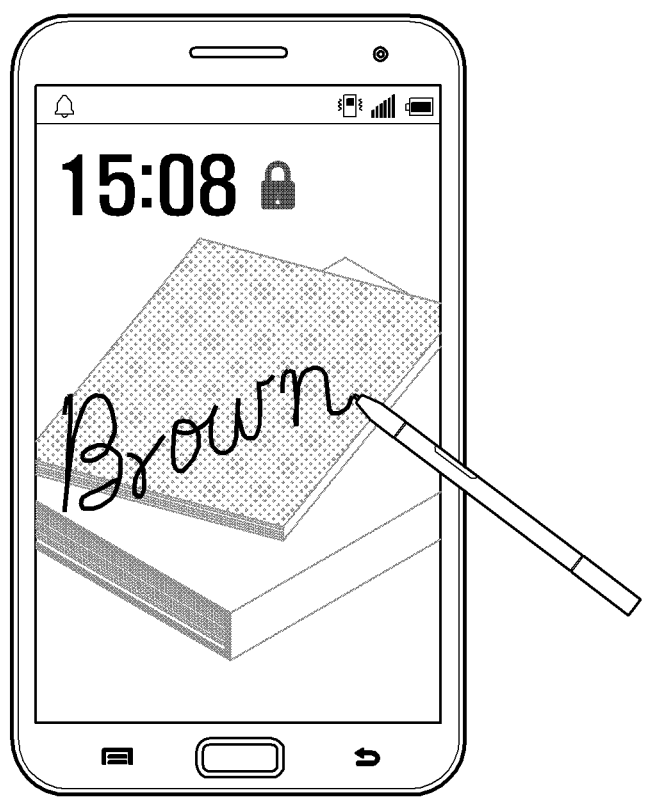
FIG. 9 illustrates a signature input to release a lock of a mobile device according to an embodiment of the invention.

As shown in FIG. 9, the mobile device 100 detects an input of a signature for releasing the lock state, on the lock screen. The input may be a touch input by a stylus pen or a shape forming a word 'Brown.'

When detecting an input at step 310, the mobile device 100 identifies the input means at step 320.

The mobile device 100 identifies an input means, such as a user's finger, a stylus pen, according to a detected input. Alternatively, the mobile device 100 may include a number of sensors to detect various types of input means. In that case, the mobile device 100 identifies an input means via the corresponding sensor that detects the input. The mobile device 100 may include a number of sensors configured in a pad, such as a touch pad, an EMR pad or a TSP.

The mobile device 100 detects types of input means based on areas to which the input means is applied. For example, if the mobile device 100 ascertains that a detected area to which an input means is applied is greater than a threshold value, the mobile device 100 identifies the input means as a user's finger. If a detected area to which an input means is applied is less than or equal to the threshold value, the mobile device 100 identifies the input means as a stylus pen.

The mobile device 100 then extracts a feature of the detected input at step 330.

The embodiment may be modified in such a manner that the mobile device 100 identifies the input means and simultaneously extracts the input feature, which includes at least one of a type of input means, a shape of an inputting gesture, and a speed of an inputting gesture, for example.

As shown in FIG. 6, the mobile device 100 may extract two- or three-dimensional coordinates of a detected input at a preset period. The mobile device 100 can extract the coordinates, on a basis of a point where an input started, as the original point. Since the mobile device 100 extracts coordinates of inputs, on the basis of a relative point where an input started and not an absolute point, the mobile device 100 can extract a shape of an input operation, irrespective of the location/point where the input is detected. The mobile device 100 can calculate a movement distance (based on a measurement of pixels, mm, or cm, for example) of an input operation input during a preset period, based on the extracted coordinates, and then compute the speed of the input operation according to the period. The mobile device 100 can compute the average speed or the speed deviation for the entire input operation.

For example, the mobile device 100 can extract coordinates from the input, 'Brown,' as shown in FIG. 9, during a preset period, and create an input feature including the shape and/or the speed, based on the extracted coordinates as shown in FIG. 6.

Figure 10:
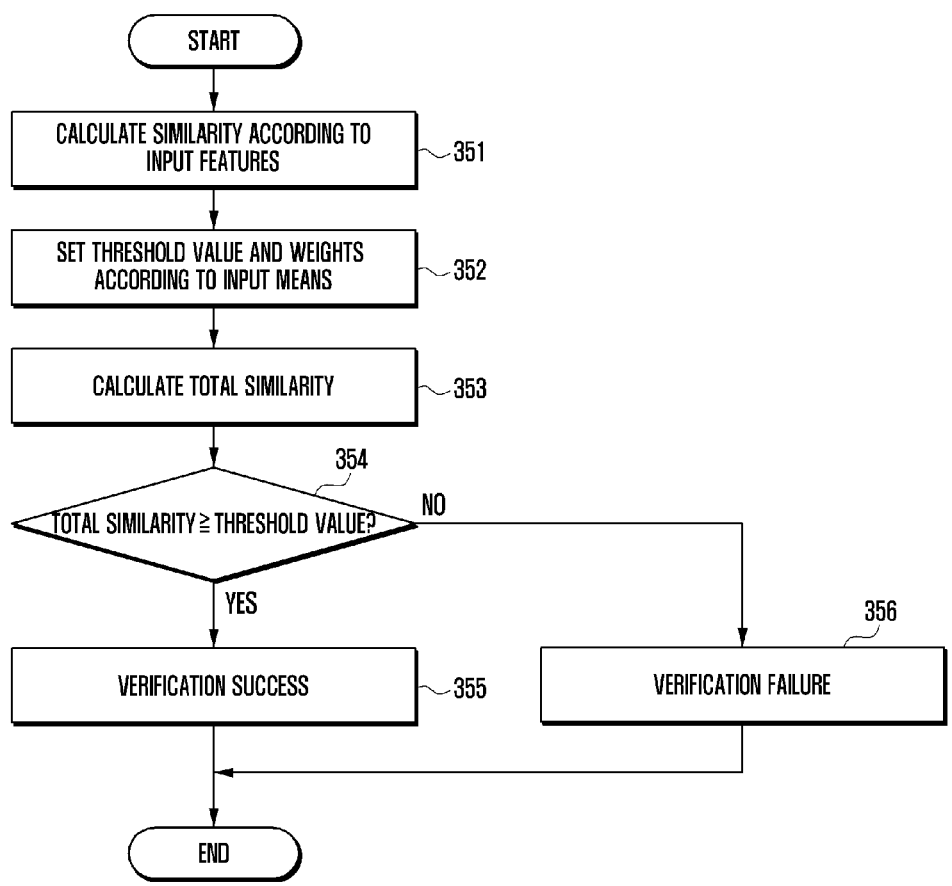
FIG. 10 illustrates a flow chart that describes a method for verifying a signature to release a lock of a mobile device according to an embodiment of the invention.

The mobile device 100 then performs user verification at step 3401, as described referring to FIG. 10.

In FIG. 10, the mobile device 100 calculates similarities according to input features at step 351.

The mobile device 100 may calculate similarities according to input features, by comparing the extracted input feature with that of previously stored signature information.

As shown in FIG. 7, the stored signature information may be created by associating input means with input features. The signature information includes an input feature that includes an input means, an input shape, an average speed, and a speed deviation, for example. A detailed description regarding the signature information has been given above referring to FIG. 7, and thus will be omitted here for the sake of conciseness.

The input means for storing signature information may be identical to or differ from that to input a signature to release the lock state. If the mobile device 100 has stored signature information that includes an input means that the user has used to input a signature, such as the finger, and the feature of the input means, a stylus pen as an input means may be used to input a signature to release the lock state.

The mobile device 100 can perform a comparison process of the identity/similarity/difference between the input properties, by using a variety of algorithms, such as a character stream comparison algorithm, including Brute Force, Knuth-Morris-Pratt, Boyer-Moore, or Shift-Or, or an image comparison algorithm such as a neural network algorithm, or a bitmap algorithm.

The mobile device 100 calculates similarities according to input features based on the comparison result. Similarity can be calculated, based on the proportion between the inputs with respect to a component (such as coordinates) configuring a shape or a speed, or the proportion of respective components. For example, the mobile device 100 can calculate the similarity of a shape, based on the number of coordinates that are equal/similar to coordinates configuring a stored feature of a shape as an input and coordinates configuring an extracted input feature, within a preset range.

As another example, the mobile device 100 can calculate the similarity of a speed, based on a proportion of the stored, input feature of a speed and the extracted speed. Alternatively, the mobile device 100 can calculate the similarity, via an algorithm that outputs scores acquired by comparing input features.

The mobile device 100 sets a threshold value and a weight, based on the input means at step 352.

The mobile device 100 sets weights according to input features, and threshold values with respect to the total similarity, based on the identified input means.

The weight refers to an index to set the degree of affection of the input feature, large or small, when the mobile device 100 calculates the similarity between the stored signature information and the detected input signature. That is, the weight may be a proportion of respective input features to the total similarity. The summation of weights for the total input feature may be 1, 10, or 100, for example. If the number of input features is two and a weight for one of the two is determined, a weight for the other of the two may be calculated by subtracting the determined weight from the summation of two weights. Therefore, if the summation of weights is set, a weight for the remaining input feature may not be stored in the mobile device 100.

Figure 11:
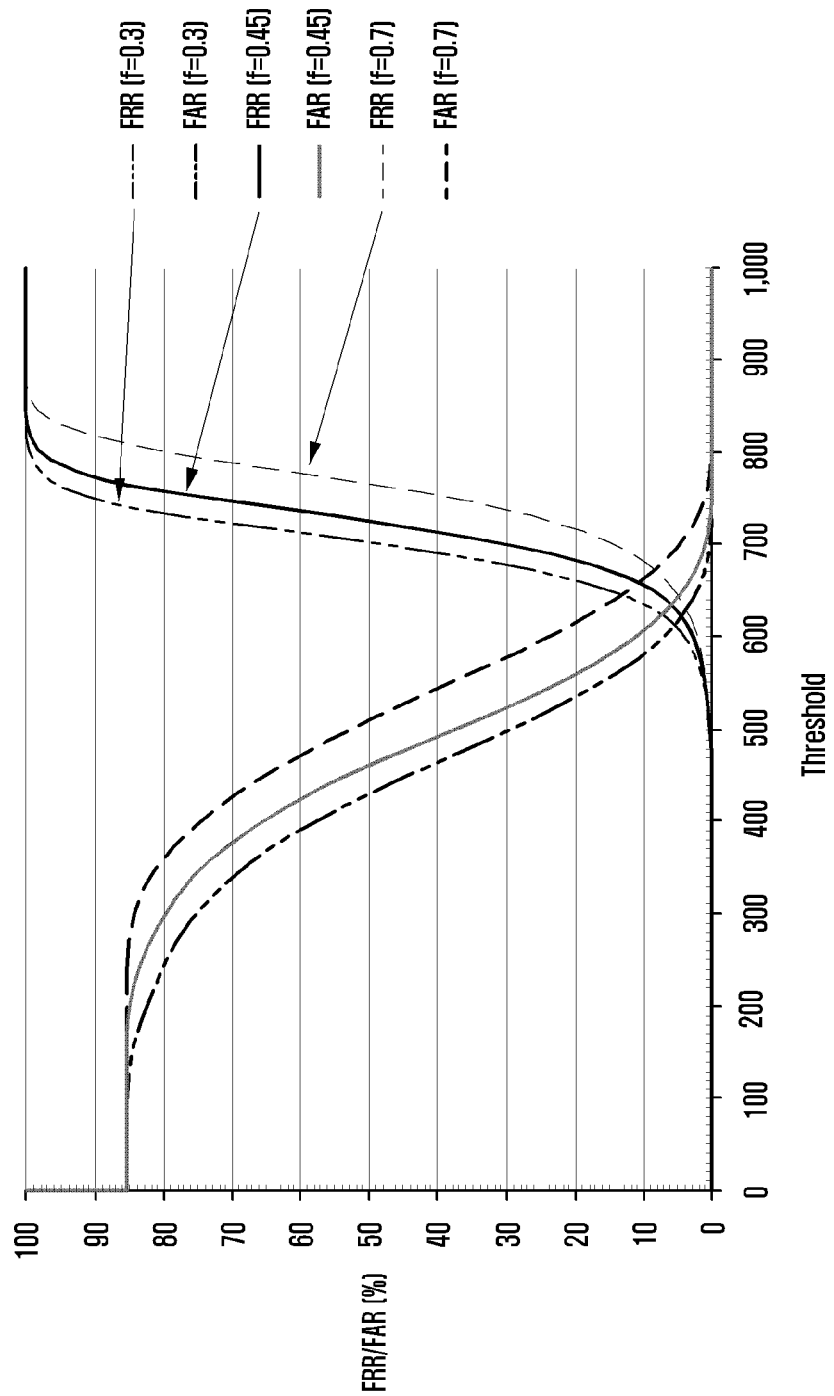
FIG. 11 illustrates graphs of the Equal Error Rate (EER) performance according to the change in weight.

The weight may be set as an optimal value to empirically maximize the input detection performance. Referring to FIG. 11 showing graphs of the EER performance according to the change in weight, the graphs show verification results for a signature input by a stylus pen, with respect to signature information that has been created by a stylus pen and stored in the mobile device 100. The EER performance indicates a value when the False Rejection Rate (FRR) and False Acceptance Rate (FAR), as the measure of the handwriting verification performance, are equal to each other. FRR refers to the ratio of the number of false rejections divided by the number of identification attempts, with respect to a user signature. FAR refers to the ratio of the number of false acceptances divided by the number of identification attempts, with respect to a user signature.

FRR and FAR are inversely proportional to each other, with respect to an identical weight. Therefore, the verification performance may be in the optimal state when FRR and FAR are equal to each other. When the EER performance is a value when FRR and FAR are equal to each other, or the lowest value while the EER varies according to weights, the weight when the EER has the lowest value is determined as the optimal weight. For example, as shown in FIG. 11, EER is 5.54% when a weight is 0.3 and 8.47% when a weight is 0.7, and a table of this result is shown in FIG. 12. Therefore, the mobile device 100 can determine the optimal weight when EER has a relatively small value of 0.3.

The threshold value refers to a limit value of the total similarity to ascertain that a signature has been verified. That is, the threshold value refers to a limit value of the total similarity to conclude that a signature input to release a lock state is identical/similar to a stored signature.

The threshold value may be set as an optimal value to empirically maximize the input detection performance. Referring to FIG. 11, the graphs have the threshold value when the maximum value of the horizontal axis is 1000. For example, as shown in FIG. 11, regarding graphs with a weight of 0.3, the EER has 5.54% and the threshold value is 610. In addition, regarding graphs with a weight of 0.7, the EER has 8.47% and the threshold value is 670, as described via the table shown in FIG. 12. The mobile device 100 sets a threshold value corresponding to an optimal weight as an optimal threshold value. For example, when an optimal value of a weight is 0.3, the mobile device 100 sets the threshold value, 610, as the optimal threshold value.

EER performance, the threshold value and the optimal weight according to the EER performance depend on whether an input means that input stored signature information is identical to the input means that inputs a signature to release a lock state.

FIG. 13 illustrates a table of the EER performance and the threshold values, according to the change of input means. The table shows the EER performance and the threshold values if signature information has been stored via an input means, such as a stylus pen or a finger, and a signature to release a lock state is input via the input means.

Referring to FIG. 13, if an input means for stored signature information differs from that that inputs a signature, with respect to the same weight, the EER performance is deteriorated over 10%. Therefore, instead of using a fixed weight and threshold value, the mobile device 100 flexibly varies a weight according to an input means and the threshold value, and sets the optimal weight and the optimal threshold value.

The mobile device 100 can previously store weights and the corresponding threshold values, based on empirically set data. As shown in FIG. 14, the mobile device 100 can store optimal weights according to input means and the corresponding threshold values in the table illustrated in FIG. 14.

Referring back to FIG. 10, the mobile device 100 can calculate the total similarity at step 353, based on the similarities according to input features and the weights corresponding to input means. The mobile device 100 can calculate the total similarity, based on the similarities according to the respective input features, $Similarity_1$, $Similarity_2$, ..., $Similarity_n$, and the weights for the respective input features, $f_1, f_2, ..., f_n$. The total similarity is expressed as shown in the following Equation (1).

$$\text{Total similarity} = f_1 \times (\text{Similarity}_1) + f_2 \times (\text{Similarity}_2) + \ldots f_n \times (\text{Similarity}_n) \quad (1)$$

If the similarity according to input features is comprised of a similarity of shape and a similarity of speed and the summation of the total weight is 1, the mobile device 100 can calculate the total similarity as shown in the following Equations (2) and (3).

$$\text{Total similarity} = \text{Weight} \times (\text{Shape Similarity}) + (1 - \text{Weight}) \times (\text{Seed Similarity}) \quad (2)$$

$$\text{Total similarity} = \text{Weight} \times (\text{Speed Similarity}) + (1 - \text{Weight}) \times (\text{Shape Similarity}) \quad (3)$$

It should be understood that Equations (2) and (3) may be modified to a variety of forms or applied to other formulae, according to types and number of input features.

The mobile device 100 then determines whether the total similarity is greater than or equal to the threshold value at step 354.

If the mobile device 100 ascertains that the total similarity is greater than or equal to the threshold value at step 354, the mobile device 100 concludes that the verification is successful at step 355.

If the mobile device 100 ascertains that the total similarity is less than the threshold value at step 354, the mobile device 100 concludes that the verification has failed at step 356.

Referring back to the procedure of FIG. 8, the mobile device 100 determines whether the verification is successful at step 350, based on the verification procedure result.

If the mobile device 100 ascertains that the verification is successful at step 350, the mobile device 100 releases the lock state at step 360.

Figure 15:
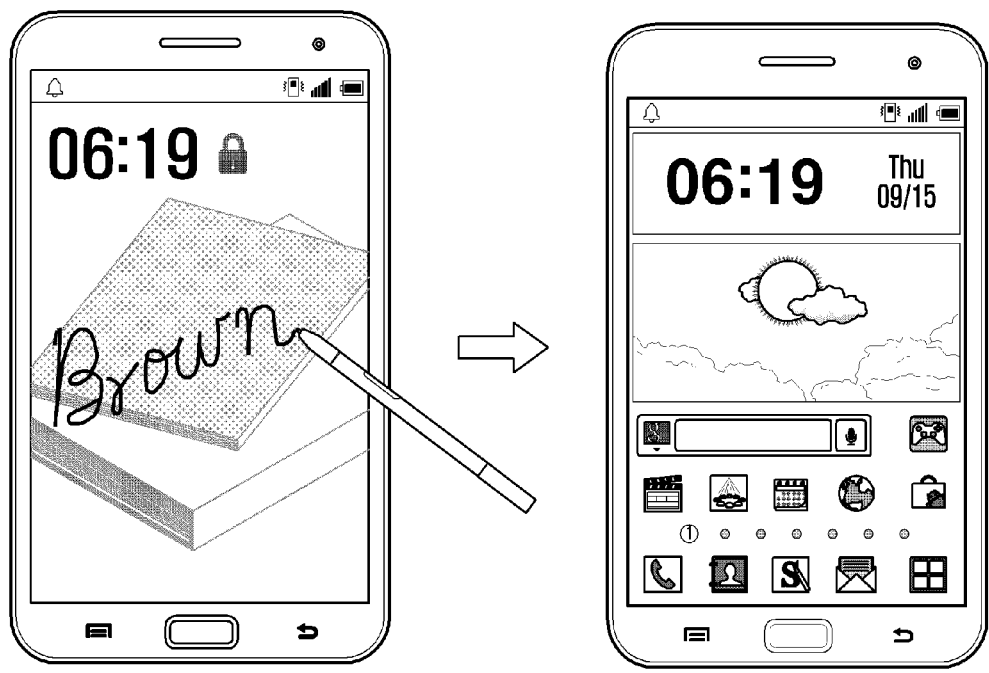
FIG. 15 illustrates an example when the lock state of a mobile device is released.

After releasing the lock state, the mobile device 100 displays an application, a program, or a service, which has been executed before the lock state, or information related to lock release. Referring to FIG. 15, when signature verification is successful in a lock state, the mobile device 100 releases the lock state and displays an idle screen.

If the mobile device 100 ascertains that the verification has failed at step 350, the mobile device 100 maintains the lock state at step 370, and outputs a message, an image, an emoticon, or an alert sound, for example, in order to re-input a signature for releasing the lock state. The mobile device 100 may not allow the user to input a control operation or a signature, until a preset period of time has elapsed.

As described above, the lock-releasing method and the mobile device adapted to the method, according to the present invention, enables a signature input by a user's hand and a stylus pen as a lock release means, thereby performing a lock-releasing operation via a more sophisticated input pattern and thus protecting the personal information more securely.

The lock-releasing method and the mobile device according to the present invention, minimize the signature verification performance deviation of signatures input by a user's hand and a stylus pen, thereby increasing the signature verification performance.

Although embodiments of the invention have been described in detail hereinabove, it should be understood that many variations and modifications of the basic inventive concept herein described, which may be apparent to those skilled in the art, will still fall within the spirit and scope of the embodiments of the invention as defined in the appended claims.

What is claimed is:

1. A method for releasing a lock state of a mobile device, comprising:
   detecting a touch input;
   distinctively identifying a type of input means corresponding to the touch input and input features of the touch input, wherein the input features comprise a shape of the touch input, an average speed of the touch input and a speed deviation of the touch input;
   calculating similarities of each of the input features by comparing each of the input features with each of input features of previously stored signature information;
   setting weights in respect of the similarities of each of the input features, based on the type of input means corresponding to the touch input;
   calculating a total similarity, based on the similarities of each of the input features and the weights; and
   determining of releasing the lock state of the mobile device, based on the total similarity.

2. The method of claim 1, wherein the type of input means comprises a finger or a stylus pen.

3. The method of claim 1, wherein setting weights comprises:
   setting weights that minimize an Equal Error Rate (EER) performance for signature verification in a signature verification performance experiment.

4. The method of claim 1, further comprising:
   setting a threshold value of the total similarity, based on the type of input means;
   determining whether the total similarity is greater than or equal to the threshold value; and determining whether a verification is successful, based on the determination as to whether the total similarity is greater than or equal to the threshold value.

5. The method of claim 4, wherein setting the threshold value comprises:
setting the threshold value corresponding to the weights that minimize an Equal Error Rate (EER) performance for signature verification in a signature verification performance experiment.

6. The method of claim 1, wherein the total similarity is calculated based on the following:

$$\text{Total similarity} = f_1 \times (\text{Similarity}_1) + f_2 \times (\text{Similarity}_2) + \ldots f_n \times (\text{Similarity}_n),$$

where $f_1, f_2, \ldots, f_n$ denote weights with respect to n input features, respectively, and $\text{Similarity}_1, \text{Similarity}_2, \ldots, \text{Similarity}_n$, denote similarities according to n input features.

7. The method of claim 1, further comprising:
detecting a touch input for registering the signature;
identifying a type of input means corresponding to the input for registering the signature;
extracting at least one input feature of the touch input for registering the signature;
creating the signature information, by associating the extracted at least one input feature with the type of input means corresponding to the touch input for registering the signature; and
storing the signature information.

8. The method of claim 7, further comprising:
re-detecting, when the number of detected touch inputs for registering the signature has not reached a preset number, a touch input for registering the signature.

9. A mobile device, comprising:
an input unit which detects a touch input; and
a controller which distinctively identifies a type of input means corresponding to the touch input and input features of the touch input, calculates similarities of each of the input features by comparing each of the input features with each of input features of previously stored signature information, sets weights in respect of the similarities of each of the input features based on the type of input means corresponding to the touch input, calculates a total similarity based on the similarities of each of the input features and the weights, and determines releasing the lock state of the mobile device based on the total similarity,
wherein the input features comprise a shape of the touch input, an average speed of the touch input and a speed deviation of the touch input.

10. The mobile device of claim 9, wherein the type of input means comprises a finger or a stylus pen.

11. The mobile device of claim 9, wherein the controller sets a threshold value of the total similarity, based on the type of input means, determines whether the total similarity is greater than or equal to the threshold value, and determines whether a verification is successful, based on the determination as to whether the total similarity is greater than or equal to the threshold value.

12. The mobile device of claim 11, wherein the controller sets weights that minimize an Equal Error Rate (EER) performance for signature verification in a signature verification performance experiment, and threshold values corresponding to the weights.

13. The mobile device of claim 9, wherein the total similarity is calculated based on the following:

$$\text{Total similarity} = f_1 \times (\text{Similarity}_1) + f_2 \times (\text{Similarity}_2) + \ldots f_n \times (\text{Similarity}_n),$$

where $f_1, f_2, \ldots, f_n$ denote weights with respect to n input features, respectively, and $\text{Similarity}_1, \text{Similarity}_2, \ldots, \text{Similarity}_n$, denote similarities according to n input features.

14. The mobile device of claim 9, wherein:
the input unit detects a touch input for registering the signature;
the controller identifies a type of input means corresponding to the touch input for registering the signature, extracts at least one input feature of the input for registering the signature, and creates the signature information by associating the extracted at least one input feature with the type of input means corresponding to the touch input for registering the signature; and
the mobile device further comprises a storage unit for storing the signature information.

15. The mobile device of claim 14, wherein the controller re-detects, when the number of detected touch inputs for registering the signature has not reached to a preset number, a touch input for registering the signature.

* * * * *